(12) United States Patent
Ryngler et al.

(10) Patent No.: US 10,037,372 B2
(45) Date of Patent: Jul. 31, 2018

(54) AUTOMATED DATA REPLICATION

(71) Applicant: Microsoft Technology Licensing, LLC, Redmond, WA (US)

(72) Inventors: Oren Ryngler, Sammamish, WA (US); Anthony J. Lee, Bellevue, WA (US); Nicholas James Thomson, Redmond, WA (US); Michael Aksionkin, Kirkland, WA (US); Prasant Sivadasan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 291 days.

(21) Appl. No.: 14/940,623

(22) Filed: Nov. 13, 2015

(65) Prior Publication Data

US 2017/0140019 A1     May 18, 2017

(51) Int. Cl.
*G06F 17/30*   (2006.01)
*G06F 3/0484*  (2013.01)
*G06F 17/22*   (2006.01)
*G06Q 50/00*   (2012.01)

(52) U.S. Cl.
CPC ...... *G06F 17/30581* (2013.01); *G06F 3/0484* (2013.01); *G06F 17/2235* (2013.01); *G06F 17/30702* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 7,765,166 B2 | 7/2010 | Beringer et al. | |
| 8,224,862 B2 | 7/2012 | Sacks | |
| 8,689,098 B2 | 4/2014 | Halliday et al. | |
| 8,856,833 B2 | 10/2014 | Conness et al. | |
| 2007/0033112 A1* | 2/2007 | Nagle, Jr. | G06Q 30/0625 705/26.62 |
| 2009/0276459 A1 | 11/2009 | Trout et al. | |
| 2011/0276632 A1 | 11/2011 | Anderson et al. | |
| 2012/0236103 A1* | 9/2012 | Cahill | G06Q 10/101 348/14.01 |
| 2014/0095254 A1 | 4/2014 | Chauhan et al. | |
| 2014/0122497 A1 | 5/2014 | Eigner et al. | |
| 2014/0279629 A1 | 9/2014 | McConnell | |
| 2015/0032700 A1 | 1/2015 | Mermelstein | |

(Continued)

OTHER PUBLICATIONS

"Manage Profile Settings across Multiple Social Networks from Single Location with Bliss Control", Published on: May, 2012, Available at: http://www.technorms.com/12295/bliss-control-manage-profile-settings-multiple-social-networks-single-location.

(Continued)

*Primary Examiner* — Son T Hoang
(74) *Attorney, Agent, or Firm* — Christopher J. Volkmann; Kelly, Holt & Christenson, PLLC

(57) ABSTRACT

An input from a current user selects, for display, a profile for another user. The current user's profile, and the selected profile are compared to identify a difference. A replication tag, corresponding to the difference, is displayed in the display for the selected profile. The information giving rise to the identified difference is replicated from the selected profile to the current user's profile, based on user actuation of the replication tag.

17 Claims, 10 Drawing Sheets

(56) References Cited

U.S. PATENT DOCUMENTS

2016/0292640 A1* 10/2016 Hall .................. G06Q 10/1053

OTHER PUBLICATIONS

Diederich, et al., "Finding Communities of Practice from user Profiles Based on Folksonomies", In Proceedings of the EC-TEL06 Workshops, Oct. 1, 2006, 10 pages.

"Cloud Pages", Retrieved on: Jun. 25, 2015, Available at: http://www.gopomelo.com/3pa/cloud-pages/.

"How to Copy one User Profile to another user Profile", Retrieved on: Jun. 25, 2015, Available at: http://www-01.ibm.com/support/docview.wss?uid=swg21341558.

Hines, Kristi, "Content Scrapers—How to Find Out Who is Stealing Your Content & What to Do About It", Published on: Jan. 12, 2012, Available at: https://blog.kissmetrics.com/content-scrapers/.

* cited by examiner

AUTOMATED DATA REPLICATION

BACKGROUND

Computer systems are currently in wide use. Many computer systems are deployed at organizations where users (who may be employees of the organization) use the computer systems in order to facilitate the performance of various tasks, workflows, processes, and other functions at the organization.

In some organizations, users use the computer systems in order to perform information retrieval and other types of data acquisition. In one example, a user may use the computer system in order to identify resources of the organization (or resources in other organizations) that may be deployed in various contexts. As one example, a user may wish to identify other people or groups that have knowledge about certain tasks, projects, subject matter, etc. Thus, some such computer systems maintain a repository of information that describes other users or groups. The efficacy of using such a repository is dependent, at least in part, on the accuracy and completeness of the information in the repository.

The discussion above is merely provided for general background information and is not intended to be used as an aid in determining the scope of the claimed subject matter.

SUMMARY

An input from a current user selects, for display, a profile for another user. The current user's profile, and the selected profile are compared to identify a difference. A replication tag, corresponding to the difference, is displayed in the display for the selected profile. The information giving rise to the identified difference is replicated from the selected profile to the current user's profile, based on user actuation of the replication tag.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
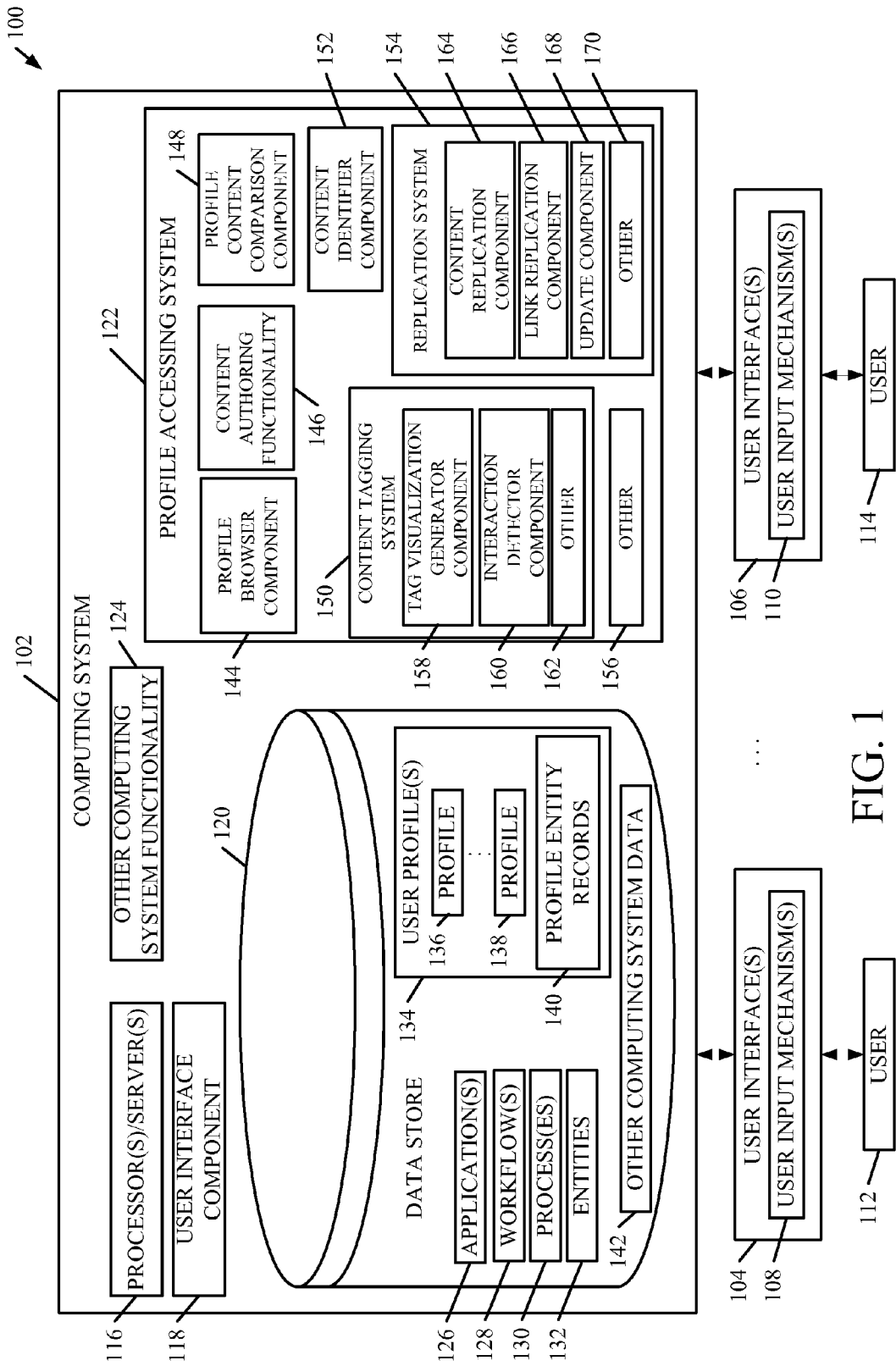
FIG. 1 is a block diagram of one example of a computing system architecture.

FIG. 1 is a block diagram of one example of a computing system architecture 100. Architecture 100 illustratively includes computing system 102 that generates user interfaces 104-106, with user input mechanisms 108-110, for interaction by users 112-114, respectively. Users 112-114 illustratively interact with user input mechanisms 108-110, in order to control and manipulate computing system 102.

Computing system 102 can be a wide variety of different types of computing systems. It can be a computing system deployed by a single organization, so that users 112-114 can access the computing system 102 in order to perform various tasks, processes, workflows, etc. For instance, users 112-114 can access computing system 102 in order to perform communication tasks, information retrieval tasks, document management tasks, various manufacturing tasks, various processes or workflows, and the like. In another example, computing system 102 may run various applications or other perform other functions for a plurality of different organizations. In one such scenario, computing system 102 may be a multi-tenant computing system. In such an example (as is described in more detail below with respect to FIG. 5), it can be hosted as a service in a cloud computing environment. Also, in one example, computing system 102 can be an on-premise system. All of these, and other, architectures are contemplated herein.

In the example shown in FIG. 1, computing system 102 illustratively includes one or more processors or servers 116, user interface component 118, data store 120, profile accessing system (or logic) 122, and it can include a wide variety of other computing system functionality (or logic) 124. Data store 120 can include a wide variety of different types of information, such as applications 126, workflows 128, processes 130, entities 132, user profiles 134 (which can include a set of individual profiles 136-138, each of which can be generated by, or maintained for, a different corresponding user 112-114), as well as profile entity records 140 that the individual profiles 136-138 can link to. Data store 120 can also include a wide variety of other computing system data 142.

Profile accessing system 122 can include a profile browser or viewing component (or logic) 144, content authoring functionality (or logic) 146, profile content comparison component (or logic) 148, content tagging system (or logic) 150, content identifier component (or logic) 152, replication system (or logic) 154, and it can include other items (or logic) 156. Content tagging system 150, itself, illustratively includes visualization generator component (or logic) 158, interaction detector component (or logic) 160, and it can include other items (or logic) 162. Replication system (or logic) 154, itself, illustratively includes content replication component (or logic) 164, link replication component (or logic) 166, update component (or logic) 168, and it can include other items (or logic) 170.

Before describing the overall operation of architecture 100 in more detail, a brief overview of some of the items in architecture 102 will first be provided. Processors or servers 116 can illustratively run applications 126 to perform workflows 128, processes 130, etc. In addition, it can operate on entities 132 or other records or data. Entities 132, for instance, can include objects or items with more rich functionality, that represent items within computing system 102. For instance, a customer entity can describe and represent a customer. A user entity can describe and represent a user. A vendor entity can describe and represent a vendor, etc. This is only a small list of examples of the types of things that entities 132 can represent within computing system 102.

Other computing system functionality 124 can be used to perform a wide variety of other computing system functions on computing system 102. The types of functionality 124 that can be provided will depend on the particular type of computing system 102. For instance, where computing system 102 is a business system, such as a customer relations management (CRM) system, an enterprise resource planning (ERP) system, or a line-of-business system, functionality 124 may include a first set of functions. However, where system 102 is an electronic mail system, a document management system, or another type of system, then functionality 124 may provide other functions. Where system 102 is a combination of these or other systems, then functionality 124 may provide a superset of functionality, or still other functionality.

User profiles 134, and in particular each individual user profile 136-138, may contain information about the various users 112-114 for which a user profile 136-138 is maintained. Profile accessing system 122 illustratively allows users 112-114 to access the various profiles 136-138 in user profile store 134. The profiles 136-138 may link to various profile entity records 140, which may be stored along with profiles 134, or in a different location. For instance, where a user's profile indicates that the user has attended a certain learning institution, then the user's profile may contain a link to an entity that represents that institution. This is only one example, and more detailed description of a profile is provided below with respect to FIG. 2.

Profile browser component 144 allows an individual user 112 to browse the profiles 136-138. The user can view a profile corresponding to himself or herself, or the profiles of other users. Content authoring functionality 146 allows a user to author profile content to be stored in the user's own profile.

In some examples, users 112-114 may attempt to identify other users or groups that have expertise in a certain subject matter area. Alternatively, a given user may attempt to find other users that have common interests, or common training or work experience. In any of these scenarios, a given user may attempt to search user profiles 134 to identify such information. Therefore, it is important that the individual user profile records 136-138 be accurate, and up-to-date. However, it can currently be cumbersome for a given user to update his or her individual profile record. Thus, many computing systems contain profile records that are outdated or inaccurate in various ways.

In architecture 100, profile accessing system 122 allows a given user (such as user 112) to navigate to the profile of another user (such as user 114). System 122 identifies differences between the profile for user 112 and the selected profile that is being displayed (e.g., the profile for user 114) and displays a replication tag adjacent the different types of information. User 112 can then see information in the profile for user 114 that user 112 wishes to add to his or her own profile. When the user actuates the replication tag, system 122 automatically replicates the corresponding information from the profile for user 114 to the profile for user 112. In this way, computing system 102 will more readily contain updated profile records 136-138. Therefore, it can return more accurate results and enable users 112-114 to more accurately identify other users or groups within computing system 102, based upon their profile information.

In one example, profile content comparison component 148 illustratively performs a comparison of the profile for the current user (e.g., user 112) to a selected profile that the current user is viewing (e.g., the profile for user 114). Content tagging system 150 includes visualization generator component 158 that generates a replication tag. System 150 displays the tag adjacent information in the selected profile being viewed that is not also in the user's own profile (e.g., it displays the tag adjacent information in the profile for the user 114 that is not also in the profile for user 112). Interaction detector component 160 detects user actuation of that tag. If the user actuates the replication tag, then content identifier component 152 identifies the particular information items that the tag corresponds to, and replication system 154 replicates those items in the current user's profile. Content replication component 164 replicates various kinds of content, while link replication component 166 replicates links. Update component 168 can update other records in the system, based upon the replication.

Figure 2:
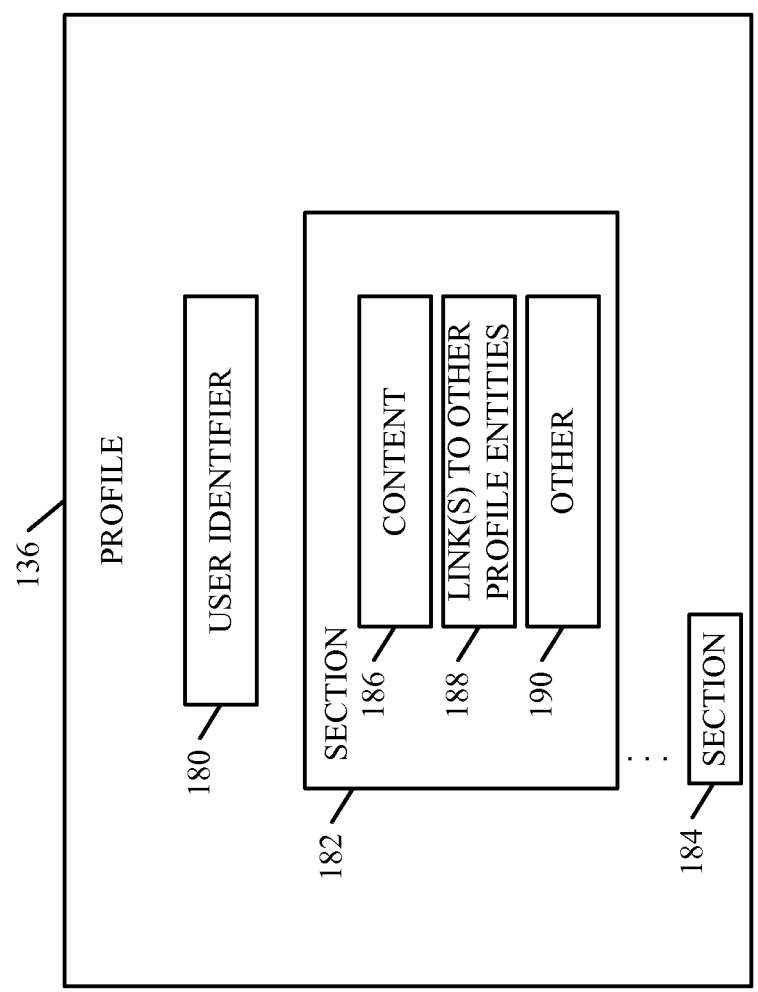
FIG. 2 is a block diagram of one example of a profile.

FIG. 2 shows one example of a user profile record 136. In the example shown in FIG. 2, the user profile record includes a user identifier portion 180, and then a plurality of different sections 182-184. The sections may correspond to different subject matter areas, such as the user's education, the user's work experience, the user's publications, etc. FIG. 2 shows that each of the sections 182-184 can include content 186, links 188 to other profile entities 140, and they can include other items 190. By way of example, if section 182 is an education section, it may include a link to a profile entity 140 corresponding to the particular university or educational organization that the user attended. The link may identify the educational organization, and it may have corresponding content 186. The content may be user-specific content, such as the years that the user attended the corresponding organization, any distinctions that the user earned (Summa Cum Laude, Magna Cum Laude, etc.), the particular degree that the user earned, etc. The content 186 may include other non-user-specific information, such as a description of the educational organization, where it is located, etc.

Figure 3:
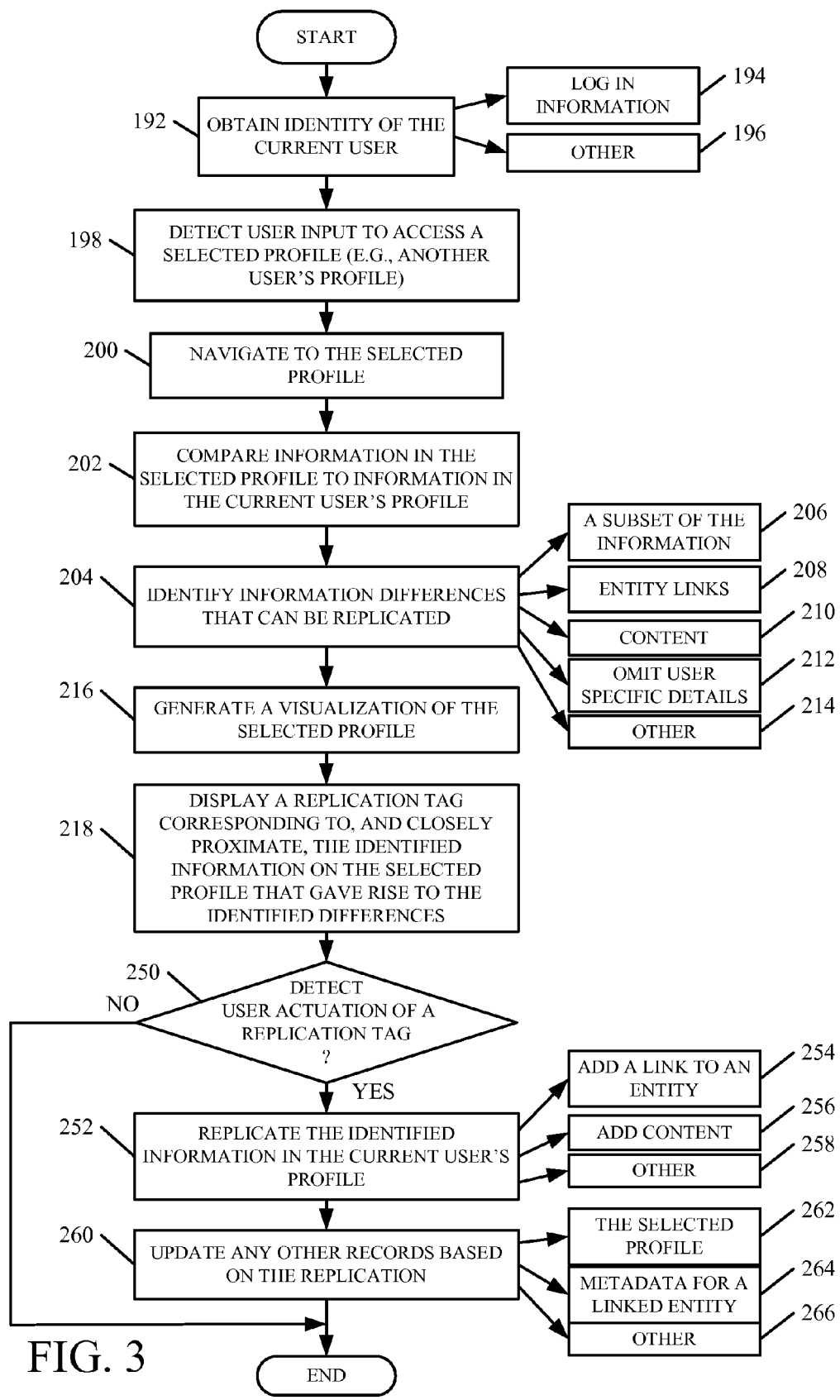
FIG. 3 shows a flow diagram illustrating one example of the operation of the architecture illustrated in FIG. 1.

FIG. 3 illustrates a flow diagram that shows one example of the operation of computing system 102, and particularly of profile accessing system 122, in allowing a user to access a selected profile of another user, and replicate information from the selected profile, to the user's own profile, using only a single user actuation input. For the sake of the description in FIG. 3, it will be assumed that user 112 (the current user) is browsing a profile (the selected profile) for user 114. It is thus assumed that user 112 has logged into, or otherwise begun accessing computing system 102.

Profile accessing system 122 obtains the identity of the current user 112. This is indicated by block 192. This can be done in a wide variety of different ways. For instance, system 122 can have access to the login or other authentication information 194 that the user provided. The user's identity can be obtained in other ways 196 as well.

Profile browser component 144 then detects a user input to access the selected profile (e.g., the profile for user 114). This is indicated by block 198. For instance, it may be that the user provides an input indicating that the user wishes to browse or otherwise navigate to view profile records 134. This can be done in a wide variety of different ways.

In response, profile browser component 144 navigates the user to the selected profile. This is indicated by block 200. Profile content comparison component 148 then retrieves the profile for the current user 112, and compares information in the current user's profile to the information in the selected profile (e.g., the profile for user 114). This comparison is indicated by block 202. Content identifier component 152 identifies information differences between the two profiles that can be replicated from the selected profile (e.g., the profile for user 114) to the profile for the current user (e.g., the profile for user 112). This is indicated by block 204.

In one example, content identifier component 152 identifies a predefined subset of the content on the selected profile that can be replicated. This is indicated by block 206.

For instance, it may be that the only types of content that can be replicated are the types of content that are not user-specific content. By way of example, if the selected profile (the profile for user 114) indicates that user 114 belongs to a given group within an organization, that content may be replicated. However, it may also indicate the date that the user 114 joined the group. That type of information is user-specific information, and it may be undesirable to replicate that content into the profile of user 112.

Similarly, the selected profile for user 114 may include links to other profile entities 140, some of which were discussed above. In that case, it may be that it is desirable to replicate the link, but any corresponding user-specific information is not replicated. For instance, the selected profile may include a link that indicates that user 114 attended a given university, and it may also show the dates of attendance. In that case, the link to the entity describing the university is not user-specific, while the dates of attendance of user 114 are user-specific. Identifying entity links as information that can be replicated is indicated by block 208. Replicating content that is not user-specific is indicated by block 210, and omitting user-specific details from the identified content is indicated by block 212. Content identifier component 152 can identify content that can be replicated in other ways as well (other than based on whether it is user-specific), and this is indicated by block 214.

Visualization generator component 158 in content tagging system 150 then generates one user actuatable display element corresponding to each item of content that can be replicated from the profile for user 114 to the profile for user 112. For purposes of the present description, the user actuatable display element will be referred to as a replication tag. Component 158 then, either by itself, or by using user interface component 118, displays the profile and the replication tag corresponding to the identified information that can be replicated. The tag can be shown in a position on the user interface display that is closely proximate the information that can be replicated. Generating a visualization of the selected profile is indicated by block 216, and displaying the replication tag in close proximity to information that can be replicated is indicated by block 218.

Figure 4A:
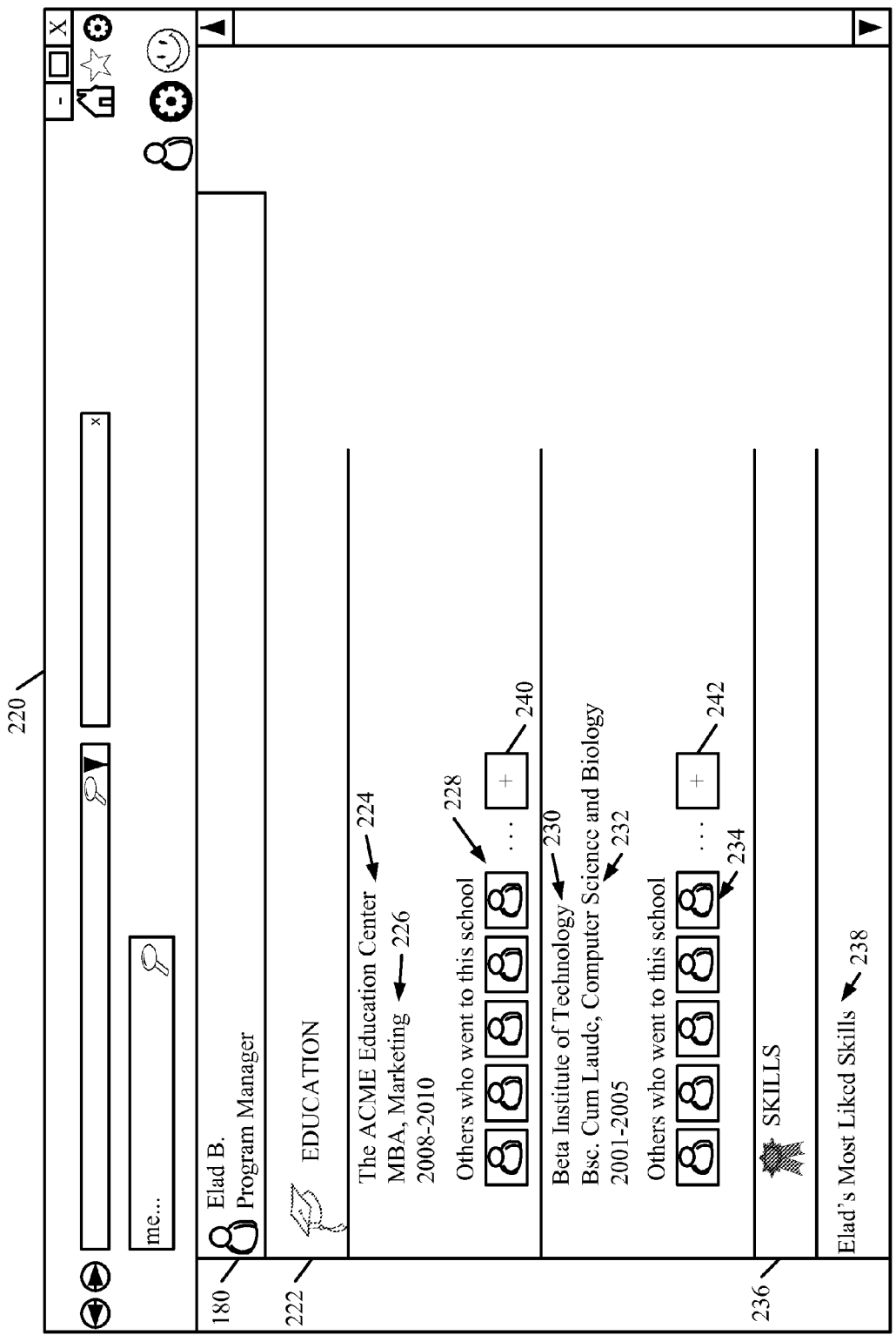
FIGS. 4A and 4B show examples of user interface displays.

FIG. 4A shows one example of a user interface display that illustrates this. FIG. 4A shows a user interface display 220 that is displaying information from a selected user profile (such as the user profile for user 114). It can be seen that the displayed profile includes a user identification section 180, an education section 222 that includes a user actuatable link 224 that links to an entity 140 for "The Acme Education Center". Link 224 has corresponding, user-specific content illustrated generally at 226. Content 226 identifies a degree that the user earned and the dates of the user's attendance. The profile also includes a set of user identifiers 228 that identify other users (for which profiles 134 exist) that attended the same educational institution.

In the example shown in FIG. 4A, education section 222 also includes a link 230 to a profile entity record 140 for the "Beta Institute of Technology". Link 230 also has user-specific content associated with it, which is generally indicated at 232. The user-specific content includes a degree that was earned, an honor ("Cum Laude") and the years of the user's attendance. A set of display elements 234 also identifies other users that attended the same institution or organization. The user profile displayed in user interface display 220 also includes another section 236 that is a skills section that has entries generally at 238 that identify the particular skills of the user identified in user identification section 180.

In FIG. 4A, it can be seen that profile content comparison component 148 has identified that the selected profile (that is being displayed in FIG. 4A) contains links 224 and 230 to two different educational institutions that are not contained in the profile for the current user who is viewing the display (e.g., they are not contained in the profile for user 112). Therefore, content identifier component 152 has identified the particular content that can be replicated (e.g., the link to the underlying profile entities 140 for the two educational institutions) and content tagging system 150 has generated and displayed replication tags 240 and 242 closely proximate the displayed links 224 and 230. Thus, if user 112 also attended "The Acme Education Center", then user 112 can simply actuate mechanism 240. Interaction detection component 160 detects the user interaction, and link replication component 166 in replication system 154 automatically replicates the link that links to "The Acme Education Center" entity into the profile record for user 112. It will be noted that the link is replicated, but the user-specific information 226 is not. Also, by "automatically" it is meant that the actions are taken or functions are performed without any user action, except perhaps to initiate or confirm them.

Similarly, if user 112 also attended "Beta Institute of Technology", then user 112 can actuate user input mechanism (replication tag) 242. Interaction detector component 160 detects the user actuation, and link replication component 166 replicates the link to the "Beta Institute of Technology" profile entity in the profile for user 112. Again, the user-specific content 232 is not replicated. Thus, the next time user 112 (or any other user) views the profile for user 112, the new links appear in the displayed profile for user 112.

The same is true for any other content that is not user-specific content, and not found in a profile. Comparison component 148 identifies that content, and content identifier component 152 identifies which items (if any), of that content, can be replicated. Content tagging system 150 displays a user actuatable input mechanism closely proximate those items, so that when a user actuates the input mechanism, the items of content are replicated from a source to a destination (e.g., to the user's profile).

Referring again to the flow diagram of FIG. 3, detecting user actuation of a replication tag is indicated by block 250, and replicating the identified information to the current user's profile is indicated by block 252. Adding a link to the current user's profile is indicated by block 254. Adding other non-user-specific content is indicated by block 256, and adding still other kinds of information is indicated by block 258.

Figure 4B:
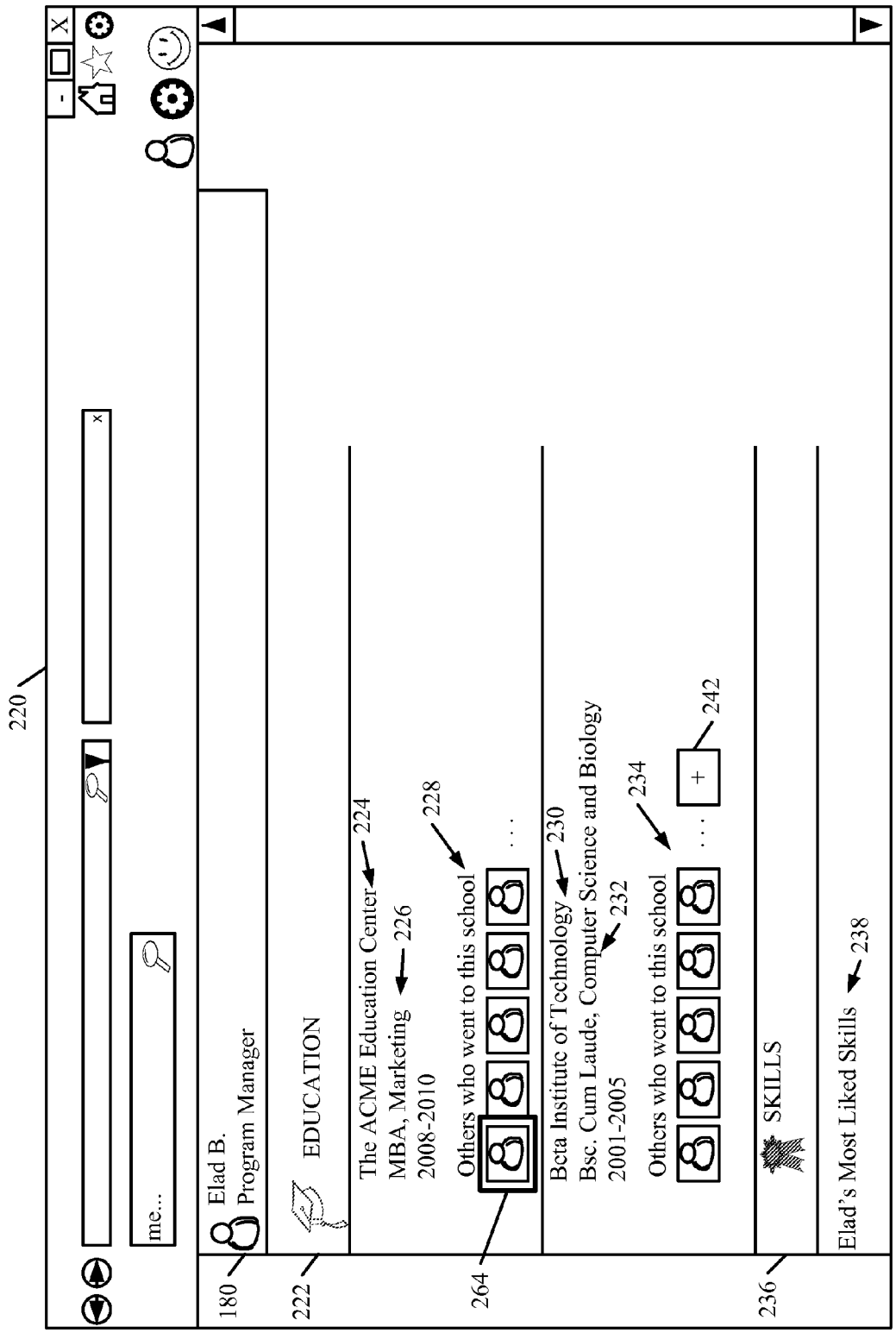

In one example, update component 168 then updates any other records based upon the replication. This is indicated by block 260. For instance, where a link is added to a profile entity record 140 (such as to an entity that represents an educational institution), then, the profile information for the profile being displayed may be updated as well. This is indicated by block 262. FIG. 4B shows one example of this.

FIG. 4B is similar to FIG. 4A, and similar items are similarly numbered. However, FIG. 4B now shows that section 228 has been updated to include an identifier 264 for the current user 112. Thus, the profile for user 114 now shows that others who attended "The Acme Education Center" include user 112, because that information has been added to the profile of user 112. FIG. 4B also shows that the replication tag 240 has been removed. This is because comparison component 148 has now determined that the link 224 appears in both the profile for user 112 and the selected profile being displayed (e.g., the profile for user 114). Thus, the replication tag 240 is automatically removed.

In another example, each of the profile entity records 140 may have corresponding metadata. For instance, an entity record 140 that represents a given educational institution may have metadata that identifies, among other things, the various users that attended that institution, such that, when a user profile is displayed, that metadata can be used to display the section (such as section 228) that identifies other users that attended the institution as well. Thus, when a link to the institution is added to a user's profile, update component 168 may update the metadata for the linked entity to indicate this. This is indicated by block 264. Update component 168 can update a wide variety of other items as well, and this is indicated by block 266.

It can thus be seen that system 122 improves the operation of computing system 102. It allows information to be quickly replicated, without a user having to navigate back and forth between different user profiles and without the user needing to generate links in the user's own profile using content authoring components. Instead, content is automatically replicated from one user profile to another. This significantly reduces the computing overhead needed for rendering various profile displays and content authoring displays. That is, normally, if a user wishes to add a link to his or her profile, the user must navigate to his or her own profile and use content authoring components. The components present various UI displays and input mechanisms that can be used. By contrast, the present system allows the user to add content to his or her own profile without using the processing overhead for rendering the UI displays and processing actuations of the input mechanisms.

It also greatly improves the efficiency of the users in attempting to maintain their own profiles. Further, because the system contains more accurate profiles, the information retrieval and searching functions of the computing system are more accurate. Thus, the accuracy of the overall computing system 102 is improved as well.

It will be noted that the above discussion has described a variety of different systems, logic and/or components. It will be appreciated that such systems, logic and/or components can be comprised of hardware items (such as processors and associated memory, or other processing components, some of which are described below) that perform the functions associated with those components. In addition, the systems, logic and/or components can be comprised of software that is loaded into a memory and is subsequently executed by a processor or server, or other computing component, as described below. The systems, logic and/or components can also be comprised of different combinations of hardware, software, firmware, etc., some examples of which are described below. These are only some examples of the different structures that can be used to form the systems, logic and/or components described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
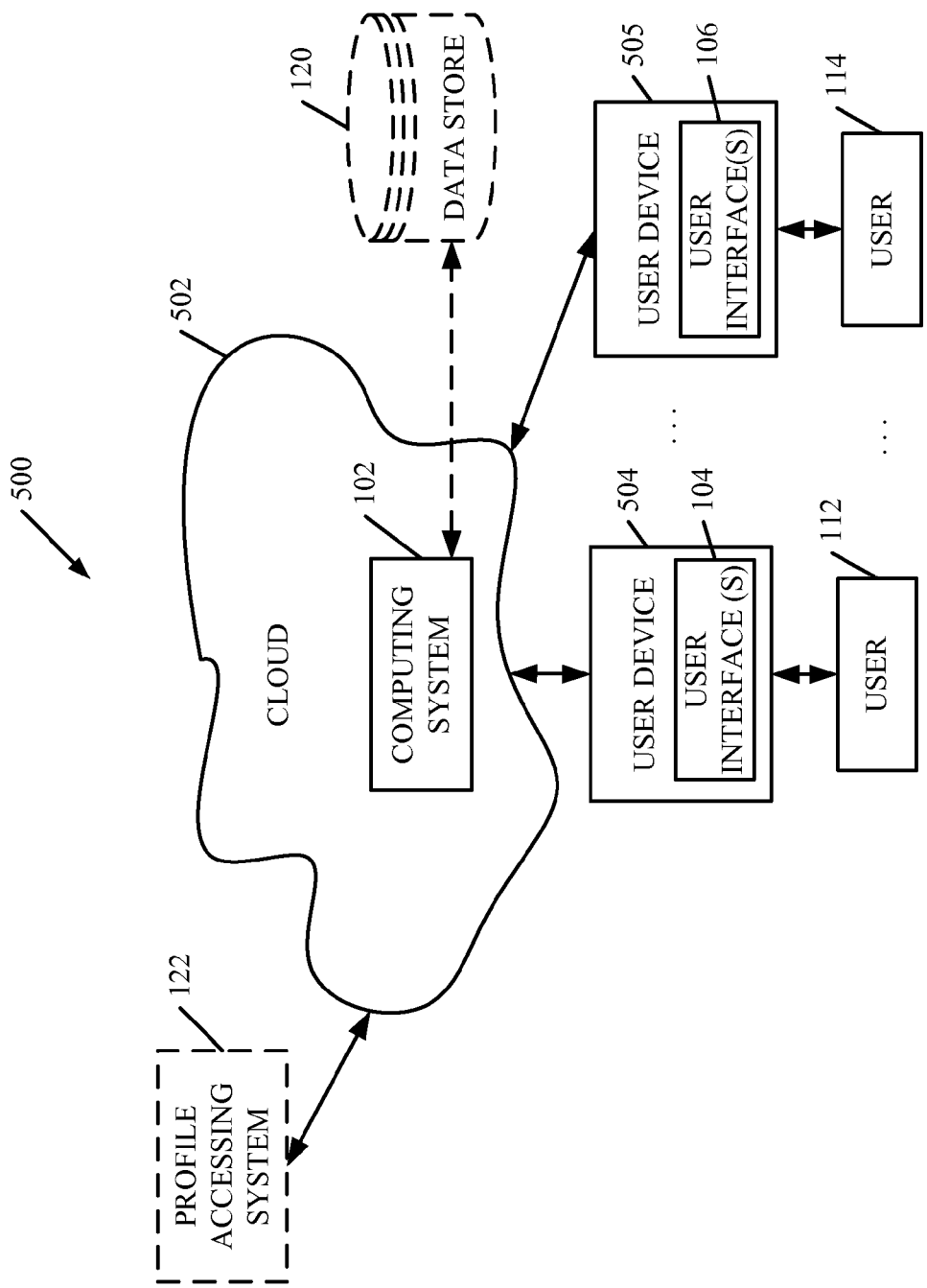
FIG. 5 is a block diagram of one example of the architecture illustrated in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that computing system 102 can be located in cloud 502 (which can be public, private, or a combination where portions are public while others are private). Therefore, users 112 and 114 use user devices 504 and 505 to access those systems through cloud 502.

FIG. 5 also depicts another example of a cloud architecture. FIG. 5 shows that it is also contemplated that some elements of computing system 102 are disposed in cloud 502 while others are not. By way of example, data store 120 can be disposed outside of cloud 502, and accessed through cloud 502. In another example, profile accessing system 122 can also be outside of cloud 502. Regardless of where they are located, they can be accessed directly by devices 504 and 505, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
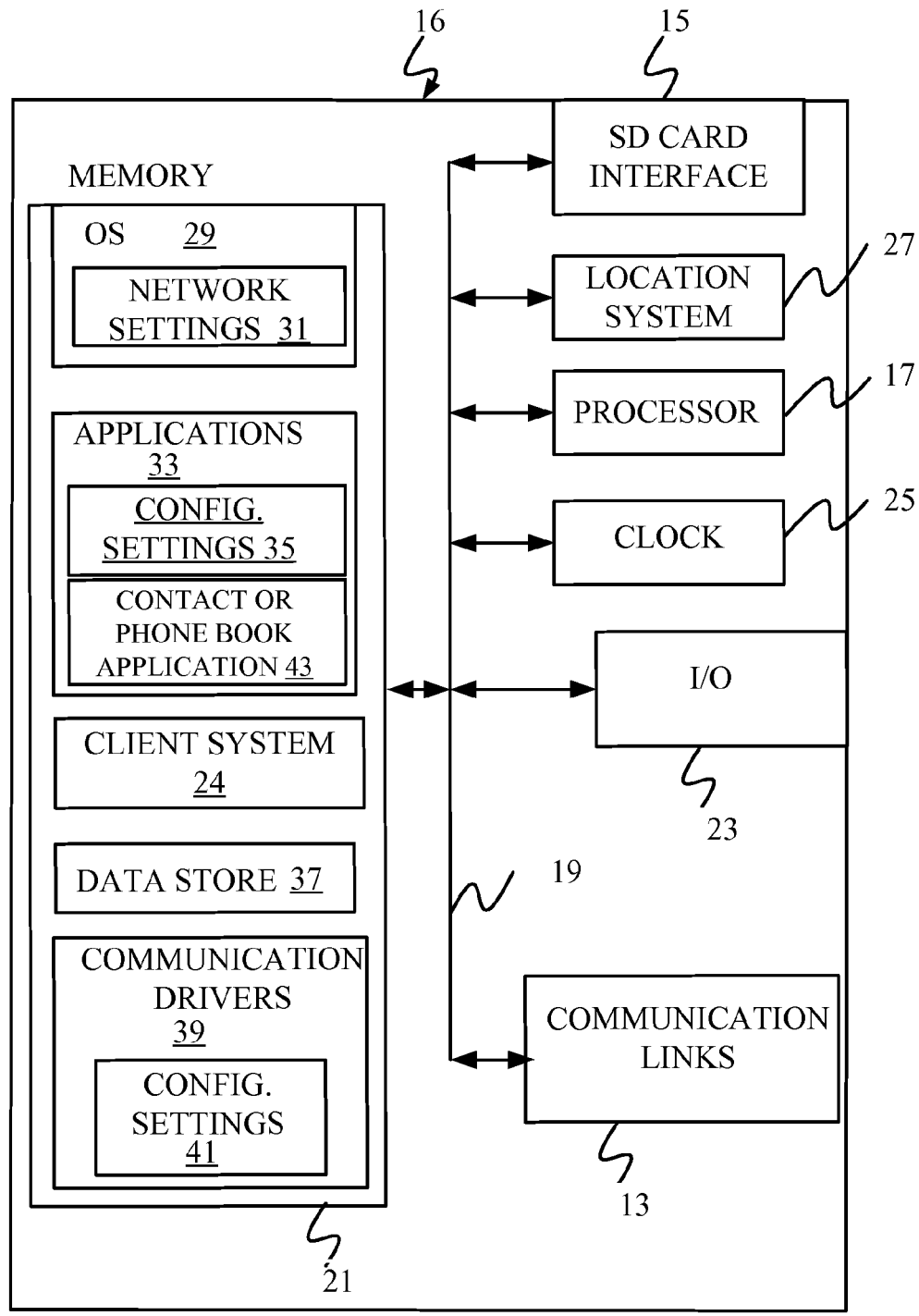
FIGS. 6-8 illustrate examples of mobile devices that can be used in the architectures of the previous figures.
Figure 7:
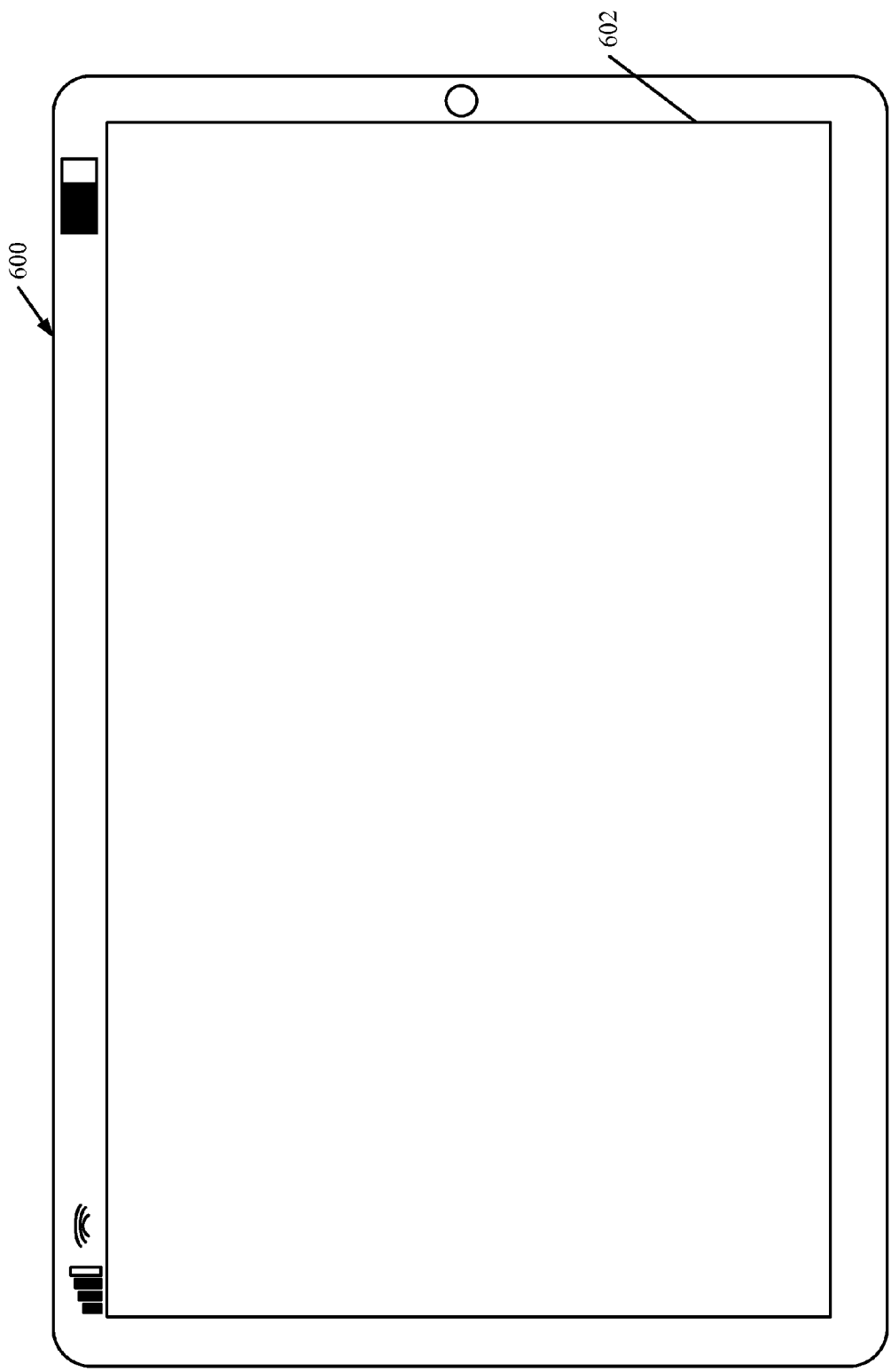
Figure 8:
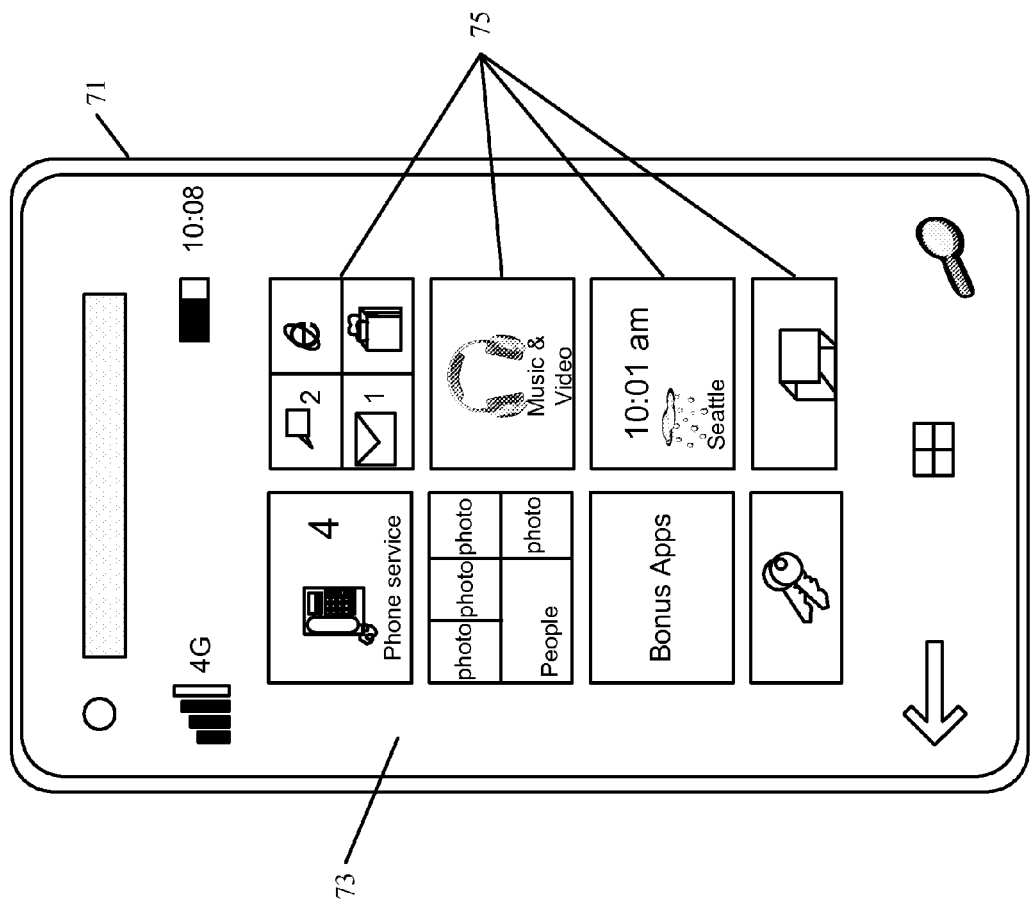

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of computing system 102 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors 116 from FIG. 1 or others) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, speech or voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one example in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1×rtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
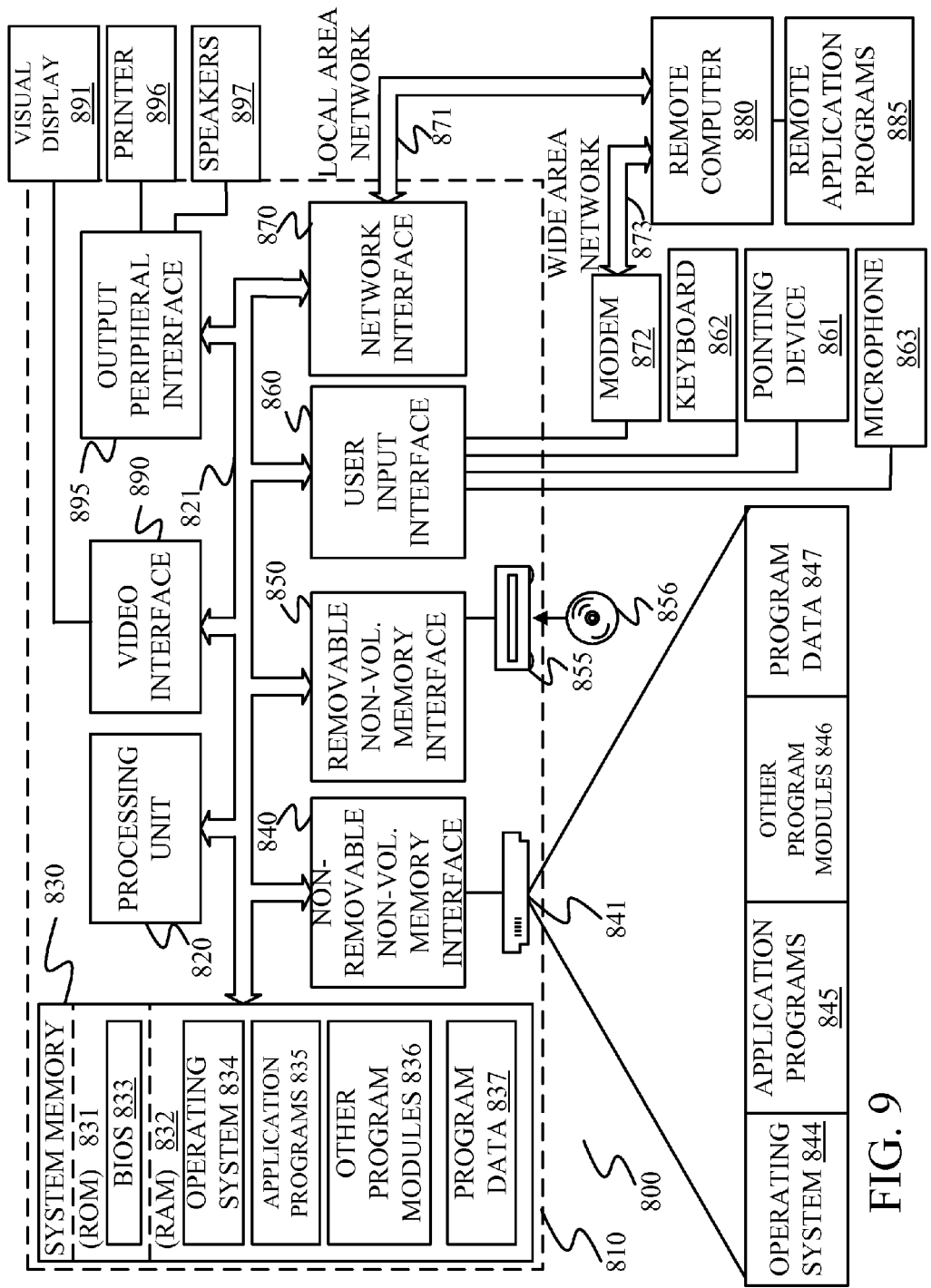
FIG. 9 is a block diagram of one example of a computing environment that can be used in the architectures of the previous figures.

FIG. 9 is one example of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processor 116, or those in the other devices discussed above), a system memory 830, and a system bus 821 that couples various system components including the system memory 830 to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:
a profile browser component that receives a user input and generates user profile visualization information indicative of a visualization of a selected user profile;
a profile content comparison component that identifies a difference between a user profile corresponding to a current user and the selected user profile;
a content tagging system that generates tag information indicative of a user actuatable visual element, in the visualization information, corresponding to the identified difference; and
a replication system that replicates the identified difference, in the user profile corresponding to the current user, based on user actuation of the visual element.

Example 2 is the computing system of any or all previous examples and further comprising:
a content identifier component that determines whether the identified difference is based on user-specific content.

Example 3 is the computing system of any or all previous examples wherein the content tagging system generates the visual element only if the identified difference is not based on user-specific content.

Example 4 is the computing system of any or all previous examples wherein the identified difference comprises a link to an entity and wherein the replication system comprises:
a link replication component that replicates the link to the entity in the user profile corresponding to the current user, based on user actuation of the visual element.

Example 5 is the computing system of any or all previous examples wherein the replication system further comprises:
an update component that updates other profile records based on replication of the identified difference in the user profile corresponding to the current user.

Example 6 is the computing system of any or all previous examples wherein the update component updates an entity record indicative of users who have profiles that include a link to the entity.

Example 7 is the computing system of any or all previous examples wherein the update component updates the visualization information for the visualization of the selected profile to indicate the replication of the link to the entity in the profile for the current user.

Example 8 is the computing system of any or all previous examples wherein the identified difference comprises content, other than a link to an entity and wherein the replication system comprises:
a content replication component that replicates the content, other than the link, to the profile for the current user.

Example 9 is the computing system of any or all previous examples and further comprising:
an interaction detector component that detects interaction information indicative of user actuation of the visual element.

Example 10 is a computer-implemented method, comprising:
receiving a user input;
generating user profile visualization information indicative of a visualization of a selected user profile based on the user input;
identifying a difference between a user profile corresponding to a current user and the selected user profile;
generating tag information indicative of a user actuatable visual element, in the visualization information, corresponding to the identified difference; and
replicating the identified difference, in the user profile corresponding to the current user, based on user actuation of the visual element.

Example 11 is the computer-implemented method of any or all previous examples wherein generating tag information comprises:
determining whether the identified difference is based on user-specific content; and
generating the visual element only if the identified difference is not based on user-specific content.

Example 12 is the computing system of any or all previous examples wherein the identified difference comprises a link to an entity and wherein replicating the identified difference comprises:
replicating the link to the entity in the user profile corresponding to the current user, based on user actuation of the visual element.

Example 13 is the computer-implemented method of any or all previous examples and further comprising:
updating other profile records based on replication of the identified difference in the user profile corresponding to the current user.

Example 14 is the computer-implemented method of any or all previous examples updating other profile records comprises:
updating an entity identifying all users who have profiles that include a link to the entity.

Example 15 is the computer-implemented method of any or all previous examples wherein updating other profile records comprises:
updating the visualization information for the visualization of the selected profile to indicate the replication of the link to the entity in the profile for the current user.

Example 16 is the computer-implemented method of any or all previous examples wherein the identified difference comprises content, other than a link a link to an entity, and wherein replicating the identified difference comprises:
    replicating the content, other than the link, to the profile for the current user.
    Example 17 is the computer implemented method of any or all previous examples and further comprising:
    detecting interaction information indicative of user actuation of the visual element.
    Example 18 is a computing system, comprising:
    profile accessing logic that receives a user input and generates user profile visualization information indicative of a visualization of a selected user profile;
    profile content comparison logic that accesses a user profile for the current user and identifies information in the selected user profile that is not found in the user profile corresponding to the current user;
    content tagging logic that generates tag information indicative of a user actuatable replication tag, in the visualization information, corresponding to the identified information in the selected profile; and
    replication logic that replicates the identified information, in the user profile corresponding to the current user, based on user actuation of the replication tag.
    Example 19 is the computing system of any or all previous examples wherein the identified information comprises a link to an entity and wherein the replication logic comprises:
    link replication logic that replicates the link to the entity in the user profile corresponding to the current user, based on user actuation of the replication tag.
    Example 20 is the computing system of any or all previous examples wherein the replication logic further comprises:
    update logic that updates an entity record that identifies users who have profiles that include a link to the entity, and that updates the visualization information for the visualization of the selected profile to indicate the replication of the link to the entity in the profile for the current user.
    Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
    a processor; and
    memory storing instructions executable by the processor, wherein the instructions, when executed, configure the computing system to provide:
        a profile selector component configured to:
            select a first user profile associated with a first user based on an indication of a profile selection user input associated with a second user;
        a profile browser component configured to
            generate a representation of a user interface display that includes a visualization of the selected first user profile;
        a profile content comparison component configured to compare the first user profile and a second user profile associated with the second user;
        a content identifier component configured to:
            based on the comparison, identify profile content in the first user profile that comprises a difference between the first user profile and the second user profile; and
        a content tagging system configured to:
            based on a determination that the identified profile content does not contain user-specific details of the first user, modify the representation of the user interface display to include a user actuatable tag display element proximate to the identified profile content and configured to visually indicate the identified difference; and
        a replication system configured to:
            based on an indication of a user actuation of the tag display element, modify the second user profile to replicate the identified profile content comprising the difference, in the second user profile.

2. The computing system of claim 1, wherein the identified profile content comprises a link to an entity and wherein the replication system comprises:
    a link replication component configured to replicate the link to the entity in the second user profile corresponding to the second user, based on the indication of user actuation of the visual element.

3. The computing system of claim 2, wherein the replication system further comprises:
    an update component configured to update at least another profile based on the replication of the identified profile content in the second user profile corresponding to the second user.

4. The computing system of claim 3, wherein the update component is configured to update an entity record indicative of users who have profiles that include the link to the entity.

5. The computing system of claim 3, wherein the update component is configured to update the visualization information for the visualization of the first user profile to indicate the replication of the link to the entity in the second user profile corresponding to the second user.

6. The computing system of claim 2, wherein the identified profile content comprises content, other than the link to the entity and wherein the replication system comprises:
    a content replication component configured to replicate the content, other than the link, to the second user profile corresponding to the second user.

7. The computing system of claim 1, wherein the instructions, when executed, configure the computing system to provide:
    an interaction detector component configured to detect interaction information indicative of the user actuation of the visual element.

8. A computer-implemented method performed by the computing device, the method comprising:
    selecting a first user profile associated with a first user based on an indication of a profile selection user input associated with a second user;
    generating a representation of a user interface display that includes a visualization of the selected first user profile;
    comparing the first user profile and a second user profile associated with the second user;
    based on the comparison, identifying profile content in the first user profile that comprises a difference between the first user profile and the second user profile;
    based on a determination that the identified profile content does not contain user-specific details of the first user, modifying the representation of the user interface display to include a user actuatable tag display element proximate to the identified profile content and configured to visually indicate the identified difference; and
    based on an indication of a user actuation of the tag display element, modifying the second user profile to replicate the identified profile content comprising the difference in the second user profile.

9. The computer-implemented method of claim 8, wherein the identified profile content comprises a link to an entity and wherein the replicating the identified profile content comprises:

replicating the link to the entity in the second user profile based on the indication of the user actuation of the visual element.

10. The computer-implemented method of claim 9, further comprising:

updating at least one other profile based on the replication of the identified profile content in the second user profile.

11. The computer-implemented method of claim 10, wherein the updating the other profile comprises:

updating an entity identifying all users who have profiles that include the link to the entity.

12. The computer-implemented method of claim 10, wherein the updating the other profile comprises:

updating the visualization information for the visualization of the first user profile to indicate the replication of the link to the entity in the second user profile.

13. The computer-implemented method of claim 8, wherein the identified profile content comprises content, other than the link to the entity, and wherein the replicating the identified profile content comprises:

replicating, the content, other than the link, to the second user profile.

14. The computer implemented method of claim 8, further comprising:

detecting interaction information indicative of the user actuation of the visual element.

15. A computing system comprising:

a processor; and memory storing instructions executable by the processor, wherein the instructions, when executed, configure the computing system to:

select a first user profile associated with a first user based on an indication of a profile selection user input associated with a second user;

generate a representation of a user interface display that includes a visualization of the selected first user profile;

compare the first user profile and a second user profile associated with the second user;

based on the comparison, identify profile content in the first user profile that comprises a difference between the first user profile and the second user profile;

based on a determination that the identified profile content does not contain user-specific details of the first user, modify the representation of the user interface display to include a user actuatable tag display element proximate to the identified profile content and configured to visually indicate the identified difference; and based on an indication of a user actuation of the tag display element, modify the second user profile to replicate the identified profile content comprising the difference in the second user profile.

16. The computing system of claim 15, wherein the identified profile content comprises a link to an entity, and wherein the instructions configure the computing system to:

replicate the link to the entity in the second user profile based on the indication of the user actuation of the replication tag.

17. The computing system of claim 16, wherein the instructions configure the computing system to:

update an entity record that identifies users who have profiles that include the link to the entity; and update the user profile visualization information for the visualization of the first profile to indicate the replication of the link to the entity in the second user profile.

* * * * *